(No Model.)
S. L. HUIZER.
VEHICLE STARTER.
No. 451,762. Patented May 5, 1891.
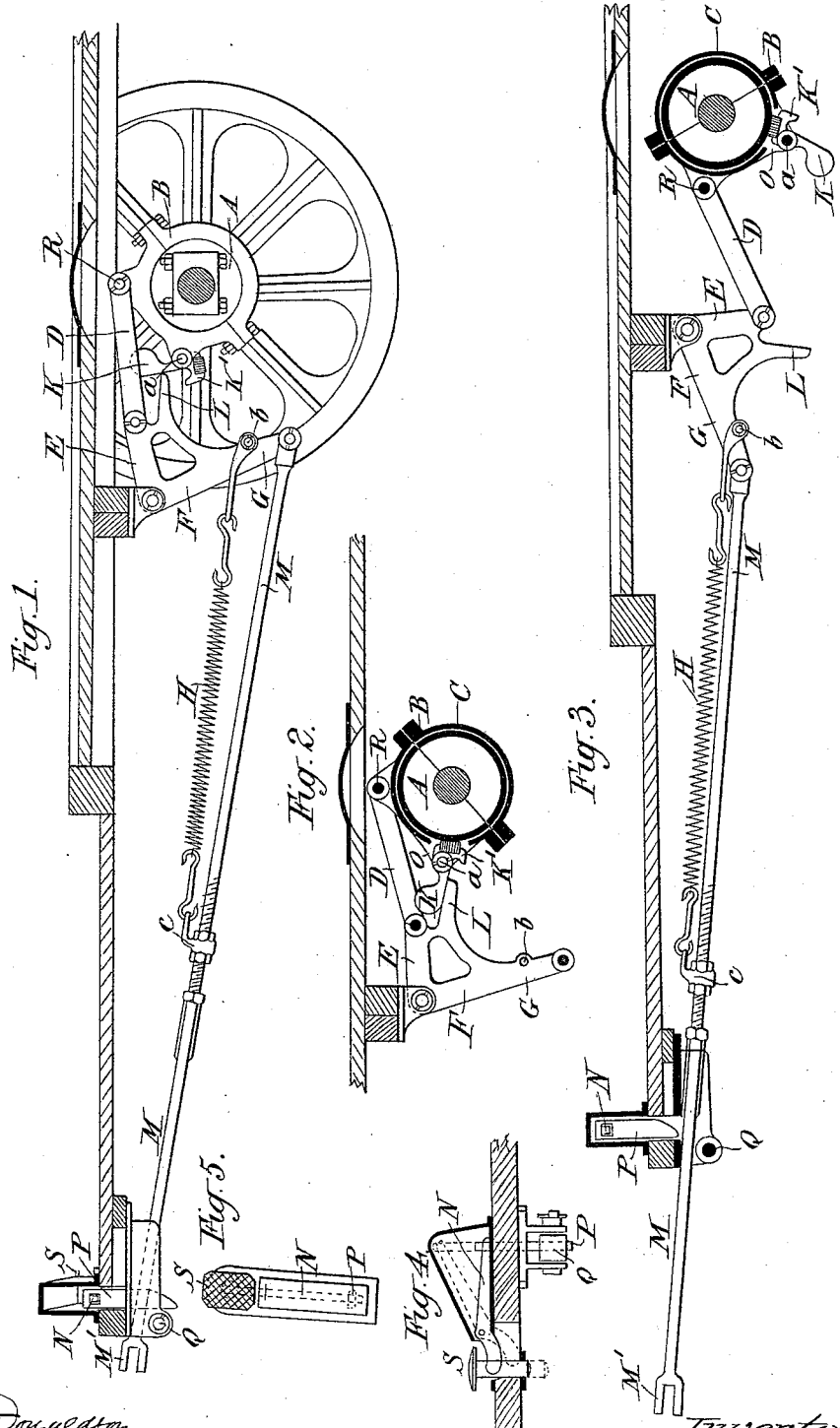
Attest
Walter Donaldson
F. L. Middleton
Inventor
Samuel L. Huizer
by Whidmay
Atty.

UNITED STATES PATENT OFFICE.

SAMUEL LEENDERT HUIZER, OF THE HAGUE, NETHERLANDS.

VEHICLE-STARTER.

SPECIFICATION forming part of Letters Patent No. 451,762, dated May 5, 1891.

Application filed February 6, 1891. Serial No. 380,484. (No model.)

*To all whom it may concern:*

Be it known that I, SAMUEL LEENDERT HUIZER, a subject of the Queen of Holland, residing at The Hague, Holland, have invented a certain new and useful Improved Vehicle-Starter, of which the following is a specification.

My invention relates to a starting device for road-vehicles generally, though it is more particularly applicable to horse tram-cars, and as applied to such it is described and illustrated in the accompanying drawings, in which—

Figure 1 represents the apparatus when the car is at rest or in full motion. Fig. 2 shows a portion of same when the car has just started. Fig. 3 shows the apparatus when the car is fully started. Fig. 4 is a section of the pedal arrangement by which the driver allows the apparatus to be operated, and Fig. 5 is a plan of same.

Upon the axle of the wheel is keyed a drum or pulley A, made in halves, so that it may be mounted on an ordinary axle. This pulley A is encircled by a band or ring B, also in halves, which are bolted together, the ring being capable of free movement on the drum or pulley. This ring B has two ears $o$ $o$, (one of which only is shown,) between which is pivoted on a pin $a$ a lug K, said lug having a heel-piece K', in which is fitted a block or shoe of wood or like material, the surface of which is somewhat roughened, and in this respect corresponds with the periphery of the pulley A. The ring B has also another ear R, on either side of which are pivoted parallel bars D or links, (one only of which is shown.) The other ends of said bars are pivoted to the short arm E of a bell-crank lever F, to the long arm G of which is connected the draw-bar M, the other end of which is furnished with a yoke M', to which is attached by a pin the usual trace-bar. A spring H is attached at one end to the point $b$ of the arm G of the lever F and at the other end to this draw-bar M at the point $c$ by means of a screw-threaded nut, to which it is hooked, said nut being capable of adjustment on the bar. This spring tends to keep the apparatus in the position shown in Fig. 1 when the car is at rest and to bring it back to that position as soon as the car has attained its regular speed. The lever F has an arm L, which holds up the lug K when the apparatus is not at work.

On the driver's platform is arranged a pedal S, which on being pressed down operates on the short arm of the lever N, the long arm of which is connected at the other end with a linchpin P and serves to raise it out of a slot cut in the draw-bar M, in which it engages when the car is at rest. The draw-bar M is supported and guided by a friction-roller Q.

The apparatus operates as follows: As soon as the horse commences to pull, the driver presses on the pedal S and withdraws the linchpin P, so that the bar M is drawn out, the bell-crank lever F being brought into the position shown in Fig. 2, up to which moment the car has not moved. The result of this motion is that the lug K is no longer supported by the arm L and tumbles over, so that its shoe is brought into frictional contact with the periphery of the pulley A. In continuing the forward movement the operations of the draw-bar M, bell-crank lever F, and connecting rods or links D press the shoe against the circumference of the pulley and draw the pulley A round, and with it the axle and wheels of the car. According to the proportions given to the two arms of the bell-crank lever it will be seen that the initial action of the horse is proportionately very sensibly increased upon the axle, so that the starting is effected with much less effort by the animal. This increase of the movement decreases with the advancement of the draw-bar until the wheels have a speed equal to that of the horse when the parts will be brought into the position shown in Fig. 3, when the heel-plate K' and its shoe, having reached the bottom of the pulley, cease to exert any pressure on the latter and the axle and pulley turn freely in the ring B. As soon as the traces are a little released or the horse slackens up, the draw-bar M recedes beneath the car by the action of the spring H, so that the parts are brought back into the first position. When the draw-bar has been completely drawn back and the slot formed therein presents itself below the bolt or linchpin P, the latter drops therein, and the car is thereafter drawn back directly from this pin.

It will be evident that for cars worked from both ends two of the above arrangements of parts are required. The apparatus, it will also be seen, will also act as a brake where the car is on a slope and commences to run backward.

What I claim is—

1. In a starting apparatus for vehicles, and in combination, a drum affixed to the axle, a ring working on same, a shoe pivoted to the ring to act on said drum, an unequal-armed lever connected to the ring and adapted to operate the shoe, a draw-bar connected to the other arm of the lever, and means for retracting and for securing the draw-bar, substantially as described.

2. In a starting apparatus, and in combination, a drum affixed to the axle, a ring working on same, a lug carrying a shoe pivoted to the ring, a bell-cranked lever F, having an arm L, adapted to operate the lug, links connecting the lever F and the ring, a draw-bar connected to the lever F, a spring for retracting said draw-bar, and a linchpin operated by the driver for releasing and securing the draw-bar, substantially as described.

In testimony whereof I have hereunto set my hand in the presence of two subscribing witnesses.

SAMUEL LEENDERT HUIZER.

Witnesses:
H. WATKINS,
L. KOOT.